W. N. DENIKE.
PLANTER.
APPLICATION FILED AUG. 16. 1921.
1,435,818. Patented Nov. 14, 1922.
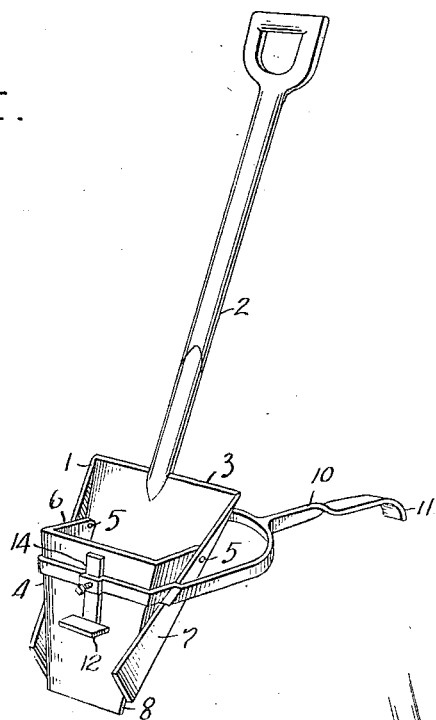
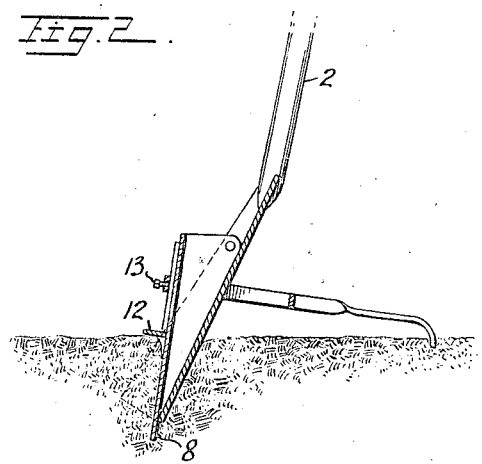
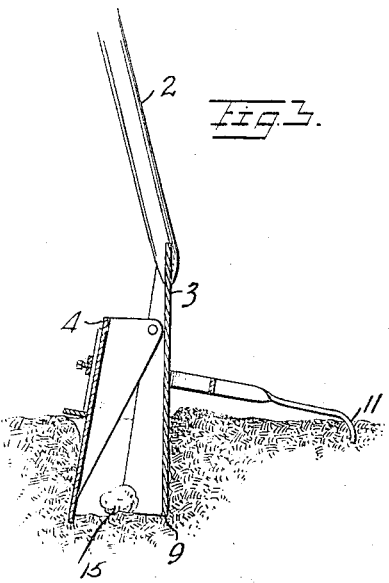
WITNESSES
H. J. Walker
Albert J. Clark
INVENTOR
WILLIAM NELSON DENIKE
BY Munn & Co
ATTORNEYS Patented Nov. 14, 1922.

1,435,818

UNITED STATES PATENT OFFICE.

WILLIAM NELSON DENIKE, OF WINNIPEG, MANITOBA, CANADA.

PLANTER.

Application filed August 16, 1921. Serial No. 492,704.

*To all whom it may concern:*

Be it known that I, WILLIAM NELSON DENIKE, a citizen of the Dominion of Canada, residing at Winnipeg, in the Province of Manitoba, Dominion of Canada, have invented certain new and useful Improvements in Planters, of which the following is a specification.

My invention relates to planters and more particularly to that class of planters which are manually operated and adapted to be forced into the ground and to provide an opening therein in which the seed, bulb or small plant may be inserted.

Another object of my invention is to provide a planter of this class with means for planting at a uniform depth and means for varying and regulating the depth of planting.

Another object of my invention is to produce a planter which is durable, inexpensive, simple in construction and efficient in operation.

Other objects of my invention reside in the construction and arrangement of parts hereinafter described.

In my invention illustrated in the drawing, similar characters of reference designate corresponding parts, in which—

Figure 1 is a perspective view of my invention.

Figure 2 is a vertical sectional view in operative position with the blades closed.

Figure 3 is a vertical sectional view in operation with the blades open.

In my invention illustrated in the drawing, I have shown a shovel or spade 1 provided with a handle 2 and blade 3. The blade 3 is tapered slightly and has its side edges turned outward at right angles forming side faces 7. Pivotally mounted to the side faces 7 of the blade 3 on pivot pins 5 is the blade 4 formed from a heavy sheet of steel. The blade 4 has a portion of its side edges bent inward, forming the side faces 6 and adapted to fit neatly between the outturned side faces 7 of the blade 3. It will be noted that the side faces 6 are tapered, the widest portion being at the top. The faces 7 are likewise tapered, the widest portion being at the bottom however. The blades 3 and 4 formed in this manner approximate a wedge-shape form when the blades are in closed position as shown in Figure 2, which facilitates their being forced into the ground. The blade 4 has an extended portion 8 which projects beyond the cutting edge 9 of the blade 3. The purpose of this portion will be explained more fully hereinafter.

The lever 10 secured to the blade 4 projects rearwardly of the planter and has its end 11 bent downward to engage and anchor into the earth. The forward end of said lever is forked, the fork arms encircling the blade 4 and being secured thereto in any convenient manner.

A sliding gauge 12 operating in the guideway 14 formed by the fork arms with the blade 4 is adapted to be locked in position by the set screw 13 so that the blade 3 can be forced into the ground to a uniform depth and which permits regulating and varying the depth to which the blade may be forced.

In operation the gauge 12 is first set as desired, the operator placing the spade in the position desired with the anchor 11 resting on the ground, the lever 10 being secured to the blade 4 will have its anchor portion 11 forced into the ground when downward pressure is applied against the spade by the action of the extended portion 8 in contact with the ground. Pressure applied to the spade by the foot of the operator will cause the planter to assume the position shown in Figure 2. The operator then rests his foot on the anchor 11 and at the same time forces the handle forward, thereby causing the blades to open, whereby a seed or bulb 15 may be inserted in the opening thus formed, as shown in Figure 3.

While the blades are still in expanded position, the operator lifts the planter, thereby withdrawing the blades from the opening and by so doing the soil pulverized by the forced opening of the blades, falls back into the opening, thereby completely covering the seed or bulb with finely pulverized loam.

Having described my invention, I now claim—

1. In a planter, in combination, a handle, a fixed blade secured to said handle, a forward blade pivotally mounted to said fixed blade and a lever secured to the forward blade, said lever comprising side arms extending to the rear past the fixed blade, an anchor to engage and anchor into the earth, and a portion connecting the side arms and the anchor whereby the foot of the operator may be applied thereto to force the anchor into the earth.

2. In a planter, in combination, a handle, a fixed blade secured to said handle, a forward blade pivotally mounted to said fixed blade having a portion projecting beyond the lower edge of the fixed blade, a lever secured to the forward blade extending past the fixed blade to the rear thereof comprising an anchor portion to engage and anchor into the earth, and a portion whereby the foot of the operator may be applied thereto to force the anchor into the earth, and a gauge secured to said forward blade to regulate the depth to which the blade may be forced.

WILLIAM NELSON DENIKE.